US008935690B2

(12) United States Patent
Kim et al.

(10) Patent No.: US 8,935,690 B2
(45) Date of Patent: Jan. 13, 2015

(54) METHOD AND SYSTEM FOR INSTALLING APPLICATIONS

(75) Inventors: Jin-hee Kim, Gyeonggi-do (KR); Dong-sung Kim, Gyeonggi-do (KR); Woo-hyuk Choi, Gyeonggi-do (KR); Young-ha Kim, Seoul (KR); Nam-geol Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 633 days.

(21) Appl. No.: 13/018,554

(22) Filed: Feb. 1, 2011

(65) Prior Publication Data

US 2011/0202914 A1    Aug. 18, 2011

Related U.S. Application Data

(60) Provisional application No. 61/304,017, filed on Feb. 12, 2010.

(30) Foreign Application Priority Data

Jul. 28, 2010   (KR) .................. 10-2010-0072852

(51) Int. Cl.
*G06F 9/445*   (2006.01)
(52) U.S. Cl.
CPC ...................................... *G06F 8/61* (2013.01)
USPC ........... 717/178; 717/172; 717/173; 717/175; 709/201; 709/202
(58) Field of Classification Search
None
See application file for complete search history.

(56) References Cited

U.S. PATENT DOCUMENTS

| 6,104,392 A * | 8/2000 | Shaw et al. ................... 715/749 |
| 6,751,671 B1 * | 6/2004 | Urien ............................ 709/229 |
| 2003/0076794 A1 * | 4/2003 | Kawasaki et al. ............. 370/329 |
| 2003/0088650 A1 * | 5/2003 | Fassold et al. ................ 709/220 |
| 2003/0120463 A1 * | 6/2003 | Cox et al. ...................... 702/186 |
| 2003/0236907 A1 * | 12/2003 | Stewart et al. ................ 709/231 |
| 2004/0224674 A1 * | 11/2004 | O'Farrell et al. ............. 455/418 |
| 2004/0225708 A1 * | 11/2004 | Christodoulou et al. ..... 709/200 |
| 2005/0114767 A1 * | 5/2005 | Sato ............................. 715/527 |
| 2007/0245238 A1 * | 10/2007 | Fugitt et al. ................... 715/700 |
| 2008/0129819 A1 * | 6/2008 | Mark et al. ...................... 348/51 |
| 2008/0189679 A1 * | 8/2008 | Rodriguez et al. ............ 717/105 |
| 2008/0228927 A1 * | 9/2008 | Toub ............................ 709/228 |
| 2008/0307390 A1 * | 12/2008 | Marchant ...................... 717/115 |
| 2009/0217359 A1 * | 8/2009 | Kikkawa et al. .................. 726/5 |

(Continued)

OTHER PUBLICATIONS

Solin, Daniel; "Generating One-Time URLs with PHP;" ONLamp.com; May 12, 2002; Retrieved from internet: http://www.onlamp.com/ipt/a/2994 ; XP002656466.

(Continued)

*Primary Examiner* — Chameli Das
(74) *Attorney, Agent, or Firm* — Cha & Reiter, LLC

(57) ABSTRACT

A method for installing an application according to an exemplary embodiment downloads an application purchased by a client and installs the application in a terminal in an asynchronous manner. The method includes transmitting a request to download at least one application to the server, downloading an application from the server in response to the request to download at least one application and storing the downloaded application, and installing the stored application in the terminal in an order of completion of downloading of the application.

20 Claims, 6 Drawing Sheets

(56) References Cited

U.S. PATENT DOCUMENTS

| | | | |
|---|---|---|---|
| 2009/0260004 A1* | 10/2009 | Datta et al. | 717/175 |
| 2010/0063929 A1* | 3/2010 | Torigai et al. | 705/44 |
| 2010/0251230 A1* | 9/2010 | O'Farrell et al. | 717/173 |
| 2010/0262958 A1* | 10/2010 | Clinton et al. | 717/171 |
| 2010/0262959 A1* | 10/2010 | Bruno et al. | 717/171 |
| 2012/0036552 A1* | 2/2012 | Dare et al. | 726/1 |
| 2012/0102110 A1* | 4/2012 | Salesky et al. | 709/204 |
| 2012/0191839 A1* | 7/2012 | Maynard | 709/223 |
| 2013/0007111 A1* | 1/2013 | Charles | 709/203 |
| 2013/0124602 A1* | 5/2013 | Miley | 709/203 |
| 2013/0238749 A1* | 9/2013 | Anka | 709/217 |
| 2013/0246929 A1* | 9/2013 | Hoffman et al. | 715/738 |
| 2013/0263220 A1* | 10/2013 | Larson et al. | 726/3 |
| 2013/0263260 A1* | 10/2013 | Mahaffey et al. | 726/22 |
| 2013/0293916 A1* | 11/2013 | Tamura | 358/1.13 |
| 2014/0196026 A1* | 7/2014 | Seo et al. | 717/178 |

OTHER PUBLICATIONS

Muehlbauer, Thomas; Patent Application Publication No. US 2007/0220592 A1; Publication Date: Sep. 20, 2007; "Comparing Media Files Against Database Content;" . . .

Gharabally, Sam, et al.; Patent Application Publication No. US 2009/0183151 A1; Publication Date: Jul. 16, 2009; "Obtaining Software for a Handheld Device;" . . .

Sivakumar, Nishant; "How To Do Synchronous and Asynchronous Web Downloads;" Jun. 28, 2002; [Retrieved from internet: http://www.codeproject.com/KB/IP/cswget01.aspx on Apr. 26, 2011]; XP002634260.

Poplett, John Harlan, et al.; Patent Application Publication No. US 2008/0160983 A1; Publication Date: Jul. 3, 2008; "Distributing Mobile-Device Applications;" . . .

* cited by examiner

METHOD AND SYSTEM FOR INSTALLING APPLICATIONS

CLAIM OF PRIORITY

This application claims priority from Korean Patent Application No. 2010-0072852, filed in the Korean Intellectual Property Office on Jul. 28, 2010, the disclosure of which is incorporated herein by reference. In addition, this application claims the benefit of U.S. Provisional Patent Application No. 61/304,017, filed in the U.S. Patent and Trademark Office on Feb. 12, 2010, the teachings of which are incorporated herein by reference.

BACKGROUND OF THE INVENTION

1. Field of the Invention

The present invention relates to a method and a system for installing applications, and more particularly, to a method and a system for installing applications on a terminal using a personal computer (PC).

2. Description of the Prior Art

Recently, as a smart phone is widely recognized and becoming prevalent, applications are increasingly downloaded and installed using an application store by users of all types.

In order to download applications in a terminal such as a mobile phone, a PC is typically used to install the applications. However, a conventional method of installing applications using a PC employs synchronization method which has drawbacks.

For example, while an application is synchronized, no operation can be performed in an application store and thus, a user has to wait until the synchronization is completed.

In addition, if an additional application is installed, it is not possible to install only the newly added application. Instead, the entire applications must be synchronized, causing inconvenience to the user.

SUMMARY OF THE INVENTION

The present invention overcomes the above-described problems and provides additional advantages, by providing a method and an apparatus for installing applications using an asynchronous method.

In accordance with another aspect of the invention, a method for installing an application that is purchased by a client and downloaded from a server in a terminal includes transmitting a request to download at least one application to the server, downloading an application from the server in response to the request to download at least one application and storing the downloaded application, and installing the stored application in the terminal in an order of completion of downloading of the application.

A protocol between the client and the server may be a Hypertext Transfer Protocol over Secure Socket Layer (HTTPS) protocol.

The storing may include downloading the application from the server in an asynchronous manner.

The storing may include downloading the application through a one-time URL address transmitted from the server.

The one-time URL address may be generated as random characters are combined and may be discarded after being used one time.

The storing may include storing an application downloaded from the server in the client in a form of package.

The installing may include receiving a response to a request for availability of installation of the application from the server, transmitting a command to side-load the application to the terminal and side-loading the application on the terminal, and if a side-loading completion call-back is received from the terminal, transmitting a command to install the application.

The installing may further include receiving an installation completion call-back from the terminal.

In accordance with another aspect of the invention, a method for installing an application that is downloaded from a server and stored in a client in a terminal includes, if a command to side-load the stored application is received from the client, side-loading the stored application from the client; if the side-loading is completed, transmitting the side-loading call-back signal to the client; and if a command to install the side-loaded application is received from the client, installing the side-loaded application in the terminal, wherein the application stored in the client is downloaded from the server and stored in an order of completion of downloading of the application.

The side-loading command and the installing command may be transmitted to the terminal using object exchange (OBEX).

The application may be side-loaded on the terminal using a Media Transfer Protocol (MTP).

In accordance with another aspect of the invention, a system for installing an application that is purchased by a client and downloaded from the server in a terminal includes an application downloading request transmitting unit which transmits a request to download at least one application to the server, an application storage unit which downloads an application from the server in response to the request to download at least one application and stores the downloaded application, and an application installing unit which installs the stored application in the terminal in an order of completion of downloading the application.

A protocol between the client and the server may be a Hypertext Transfer Protocol over Secure Socket Layer (HTTPS) protocol.

The application storage unit may download the application from the server in an asynchronous manner.

The application storage unit may include a first queue which downloads the application from the server and stores the downloaded application in an order of purchasing the application, a local storage unit which stores the application downloaded from the server in a form of package, and a second queue which stores the application stored in a form of package in an order of completion of downloading.

The application storage unit may download the application through a one-time URL address transmitted from the server.

The one-time URL address may be generated as random characters are combined and may be abolished/discarded after being used one time.

The application installing unit may include an installation availability request receiving unit which receives a response to a request for availability of installation of the application from the server, a side-loading unit which transmits a command to side-load the application to the terminal and side-loads the application on the terminal, and an installation command transmitting unit which transmits a command to install the application if a side-loading completion call-back is received from the terminal.

The application installing unit may further include an installation completion call-back receiving unit which receives an application completion call-back from the terminal.

In accordance with another aspect of the invention, a system for installing an application that is downloaded from a server and stored in a client in a terminal, includes a side-loading receiving unit which, if a command to side-load the stored application is received from the client, receives side-loading of the stored application from the client, a side-loading call-back signal transmitting unit which, if the side-loading is completed, transmits the side-loading call-back signal to the client, and a terminal installing unit which, if a command to install the side-loaded application is received from the client, installs the side-loaded application in the terminal, wherein the application stored in the client is downloaded from the server and stored in an order of completion of downloading of the application.

The side-loading command and the installing command may be transmitted to the terminal using object exchange (OBEX).

The application may be side-loaded on the terminal using a Media Transfer Protocol (MTP).

According to the various exemplary embodiments, an application may be downloaded and installed in an asynchronous manner and thus, user convenience may be enhanced.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
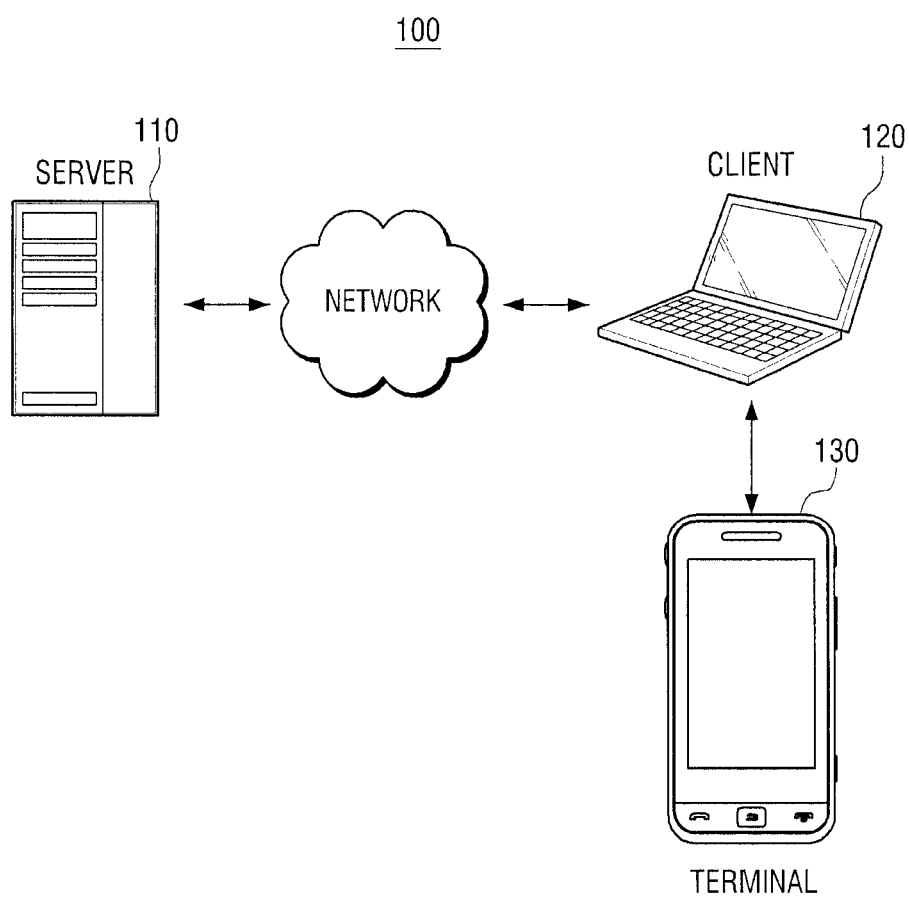
FIG. 1 is a view illustrating a system for installing applications according an exemplary embodiment.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail as they would obscure the application with unnecessary detail.

FIG. 1 is a view illustrating a system for installing applications according an exemplary embodiment. As shown, an application installing system 200 includes a server 110, a client 120, and a terminal 130. The server 110 is connected to the client 120 via a network, for example, via the Internet. The client 120 and the terminal 130 may be connected via cable or wirelessly. For example, the client 120 may be connected to the terminal 130 through a USB port or Bluetooth.

Herein, the sever 110 refers to a server which runs an application store for selling applications to users, and the server stores a plurality of applications to be transmitted to a client. The client refers to a PC which transmits a request for downloading a plurality of applications available in an application store to a server and stores applications downloaded from the server. The terminal 130 refers to a mobile phone which executes purchased applications, and may include various multimedia apparatuses such as a smart phone, a cellular phone, an MP3 player, and a PMP.

Figure 2:
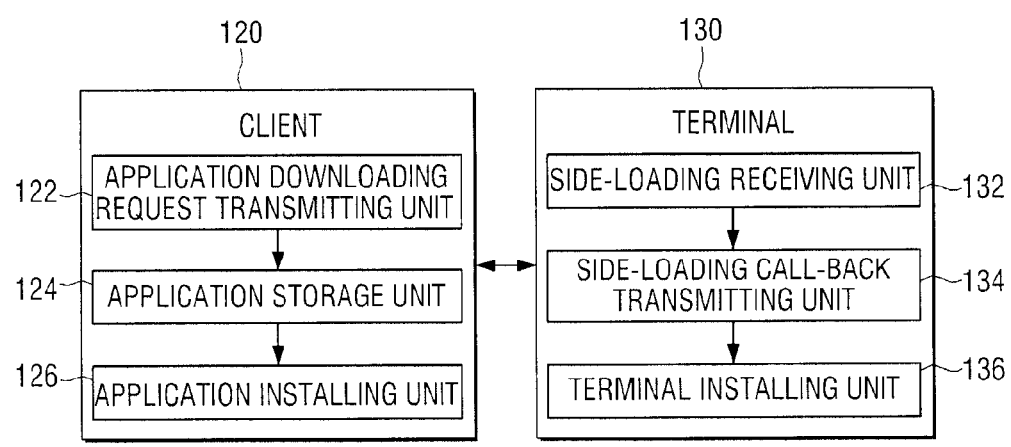
FIG. 2 is a schematic block diagram to explain functions of a client and a terminal illustrated in FIG. 1.

FIG. 2 is a schematic block diagram illustrating the functions of a client and a terminal shown in FIG. 1. As illustrated in FIG. 2, a client 120 of an application installing system 120 includes an application download request transmitting unit 122, an application storage unit 124 and an application installing unit 126, and a terminal 130 of the application installing system 120 includes a side-loading receiving unit 132, a side-loading call-back signal transmitting unit 134 and a terminal installing unit 136.

In operation, the download request transmitting unit 132 transmits a request for downloading at least one application to the server 110. The server 110 transmits an application to the client 120 in response to the download request of the client 120.

Herein, the protocol between the client 120 and the server 110 may be a Hypertext Transfer Protocol over Secure Socket Layer (HTTPS) protocol. The HTTPS protocol is employed for security reasons since the HTTPS protocol may be protected from eavesdropping while an HTTP protocol is vulnerable to eavesdropping when contents are transmitted through a specific program.

Herein, the HTTPS is an upgraded version of the HTTP which is a worldwide web communication protocol. The HTTPS is developed by Netscape Communications Corporation for authentication and encryption of communication and is widely used in e-commerce.

The HTTPS encrypts a session data through an SSL protocol or a TLS protocol instead of using a general text in socket communication. Accordingly, an appropriate level of security for the data should be guaranteed. The basic TCP/IP port of HTTPS is 443. The level of security depends on accuracy of configuration of a web browser and an encryption algorithm supporting the software of the server 110. The URL of a web page using HTTPS starts with "https://" instead of "http://".

The application storage unit 124 downloads an application corresponding to a request for downloading at least one application from the server 110 and stores the downloaded application.

Herein, the application storage unit 124 may download an application from the server 110 in an asynchronous manner. Accordingly, as an application installing system, according to an exemplary embodiment, downloads an application from the server 110 in an asynchronous manner, the client 120 may navigate other applications, that is, make inquires into or search for other applications in an application store while an application available in the application store is being downloaded or installed. In addition, only one application may be installed without synchronizing and thus, user convenience may be enhanced.

Figure 3:
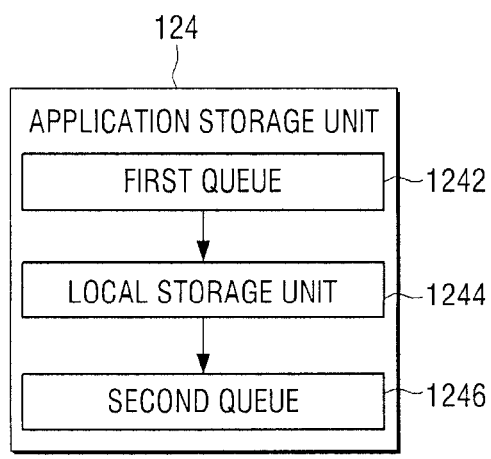
FIG. 3 is a schematic block diagram of an application storage unit illustrated in FIG. 2.

In an exemplary embodiment, the application storage unit 124 comprises a first queue 1242, a local storage unit 1244, and a second queue 1246 as illustrated in FIG. 3.

Once applications are downloaded on the client 120 from the server 110, the first queue 1242 downloads the applications from the server 110 in the order of purchase and stores them.

The local storage unit 1244 stores applications which are downloaded and stored in the first queue 1242 in the form of package. Herein, storing applications in the form of package means downloading not only one program but also other related programs together. For example, when downloading MS OFFICE, not only MS OFFICE but also other MS OFFICE-related programs such as Word, PowerPoint, and Excel are downloaded and stored.

Specifically, the local storage unit 1244 stores applications downloaded from the server 110 in the form of application binary. Herein, the application binary interface (ABI) covers details regarding how functions control and pass parameter and retrieve return values. In computer software, the ABI describes the low-level interface between an operation program and an operating system or another application, an operating program and the library of the operating program, or between application components. Herein, the ABI is distinct from an application programming interface (API) which defines interface between a source code and a library.

The second queue 1246 stores applications stored in the local storage unit 1244 in the form of package in the order of completion of downloading.

The application installing system, according to an exemplary embodiment, may install applications which are stored in the second queue 1246 in the order of downloading completion on the terminal 130 by the application installing unit 126 which will be explained later.

Referring to FIG. 2, the application storage unit 124 may download applications through a one-time URL address transmitted from the server 110 and store them. Herein, the one-time URL address is generated as random characters are combined and may be abolished/discarded after being used one time.

As the application installing system, according to an exemplary embodiment, accesses and uses a one-time URL address once and abolishes the URL address, applications may be downloaded through the one-time URL address only one time.

The application installing unit 126 installs on the terminal 130 applications which are stored in the application storage unit 124 in the order of completion of downloading. In other words, the application installing system, according to an exemplary embodiment, does not install applications on the terminal 130 in the order of purchase in a synchronous manner. Instead, the application installing system, according to an exemplary embodiment, downloads applications in asynchronous manner and stores the applications on the terminal 130 in the order of completion of downloading.

Figure 4:
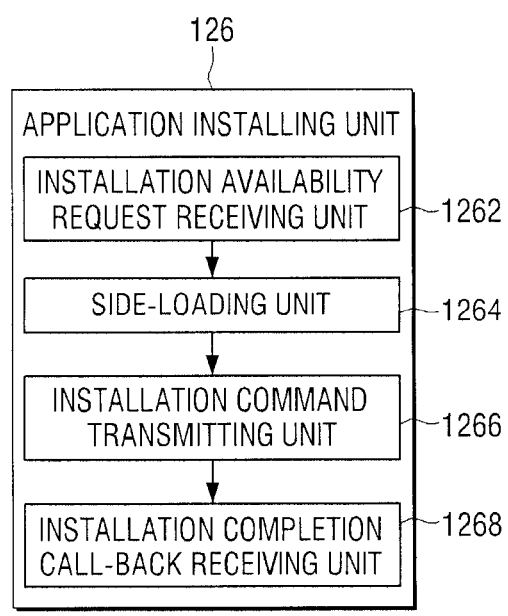
FIG. 4 is a schematic block diagram of an application installing unit illustrated in FIG. 2.

In an exemplary embodiment, the application installing unit 126 comprises an installation availability request receiving unit 1262, a side-loading unit 1264, an installation command transmitting unit 1266, and an installation completion call-back receiving unit 1268, as illustrated in FIG. 4.

The installation availability request receiving unit 1262 receives a response to a request for application installation availability from the server 110. In other words, the installation availability request receiving unit 1262 transmits a request for installation availability of an application which is purchased, downloaded, and stored from the server 110 to the server 110 and receives a response to the request from the server 110. This is to prevent, for example, an application X which is purchased by a user A and installed in the terminal 130 of the user A from being installed in the terminal 130 of a user B. The server 110 stores information regarding a user terminal such as a type of apparatus or a phone ID of the user terminal 130 which purchases an application and may transmit a response to the request for installation availability of an application to the client 120 using stored information regarding the user terminal.

The side-loading unit 1264 transmits a side-loading command of an application to the terminal 130 and side-loads the application on the terminal 130. Herein, the side-loading represents transmitting contents for a personal computer to a terminal, for example, copying and sending a music file or video, which is contents for a personal computer, to a terminal such as a cellular phone via a USB cable or wirelessly. In other words, the side-loading unit 1266 transmits a side-loading command to a terminal and actually performs side-loading of an application on the terminal.

If the installation command transmitting unit 1266 receives a side-loading completion call-back from the terminal 130, the installation command transmitting unit 1266 transmits a command to install an application to the terminal 130. That is, if the installation command transmitting unit 1266 receives a side-loading completion call-back indicating that side-loading is completed from the terminal 130, the installation command transmitting unit 1266 transmits a command to install an application to the terminal 130.

The installation completion call-back receiving unit 1268 receives an installation completion call-back indicating that installation of an application is completed from the terminal 130. That is, if the terminal 130 completes installing a side-loaded application, the installation completion call-back receiving unit 1268 receives an installation completion call-back transmitted from the terminal 130.

Referring back to FIG. 2, if the side-loading receiving unit 132 receives a command to perform side-loading of an application stored in the application storage unit 124 of the client 120, the side-loading receiving unit 132 receives side-loading of the stored application from the client 120.

If side-loading is completed, the side-loading call-back transmitting unit 134 transmits a side-loading call-back to the client 120 to inform the client 120 of completion of side-loading.

If the terminal installing unit 136 receives a command to install a side-loaded application from a client, the terminal installing unit 136 installs the side-loaded application in a terminal.

Herein, applications stored in the client 120 may be downloaded and stored from the server 110 in the order of completion of downloading. That is, in an application installing system according to an exemplary embodiment, applications are not downloaded in the order of purchase in a synchronous matter but instead, applications are downloaded in an asynchronous manner.

Herein, a side-loading command and an installation command may be transmitted to a terminal using object exchange (OBEX). The OBEX is a communication protocol between a terminal and a client, and may be regarded as a kind of MODEM communication. The OBEX is used mostly when a command is transmitted to a terminal. The OBEX is originally developed to exchange data object through an infrared link and refers to a set of protocols which facilitate exchange of objects such as vCard contact information or vCalendar schedule information using IrDA or Bluetooth.

In addition, applications may be side-loaded on a terminal using a media transfer protocol (MTP). The MTP is a protocol used mostly when a media file is transmitted to a terminal and may be used in compatible with the OBEX. Although the MTP is relatively slow in comparison with a UMS, it provides an enhanced robust security protection by preventing possibilities of virus or malicious code infiltration.

Figure 5:
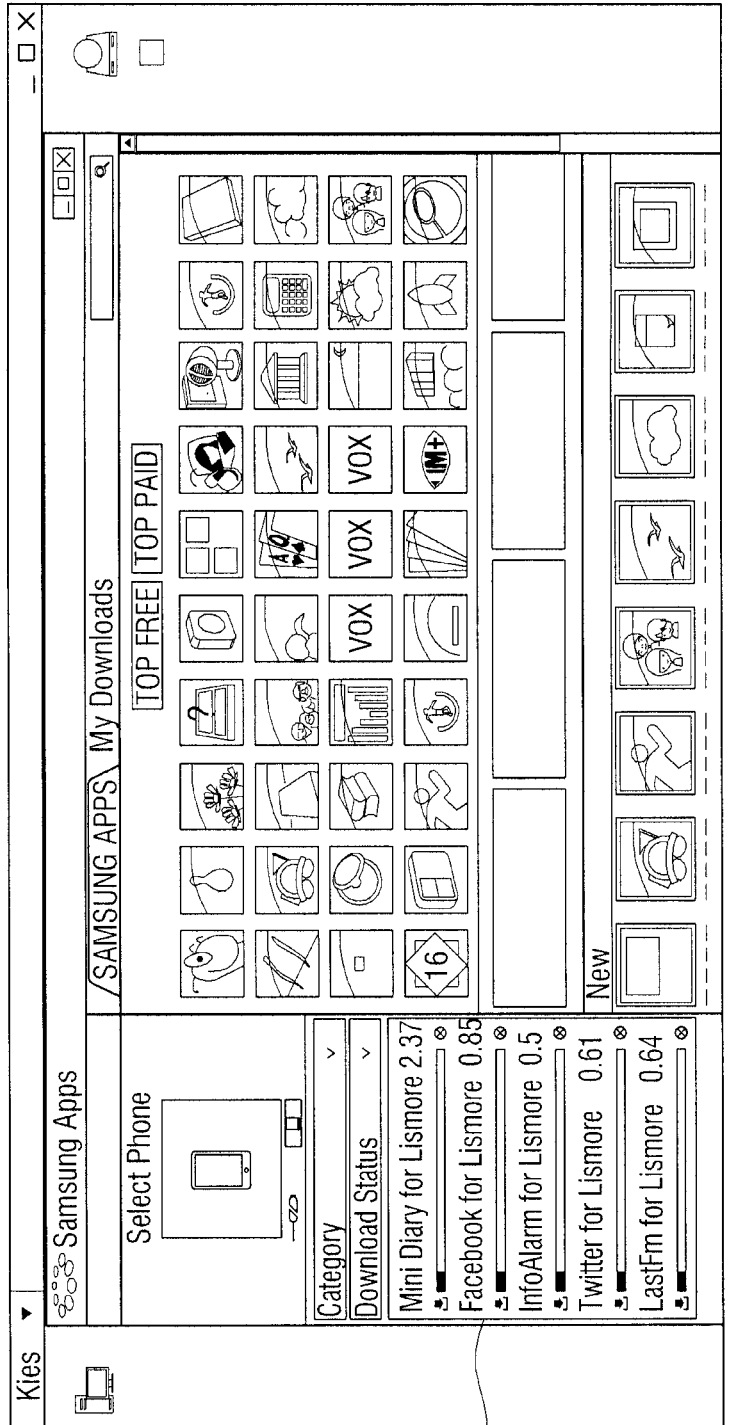
FIG. 5 is a view illustrating an example of a web browser of an application store which is executed by an application installing system according to an exemplary embodiment.

FIG. 5 is a view illustrating an example of a web browser of an application store which is executed by an application installing system according to an exemplary embodiment.

As illustrated in FIG. 5, an application store web browser displays a plurality of applications, and if an application is purchased and requested to be downloaded on a client, an application list is displayed on a download status window 501 to show applications being downloaded and the download status of each application is also displayed on the window.

In an application installing system according to an exemplary embodiment, applications are not downloaded in the order of purchase in a synchronous matter and instead, applications are downloaded in an asynchronous manner. Therefore, it is possible to navigate other applications, that is, make inquires into or search for other applications in an application store.

Figure 6:
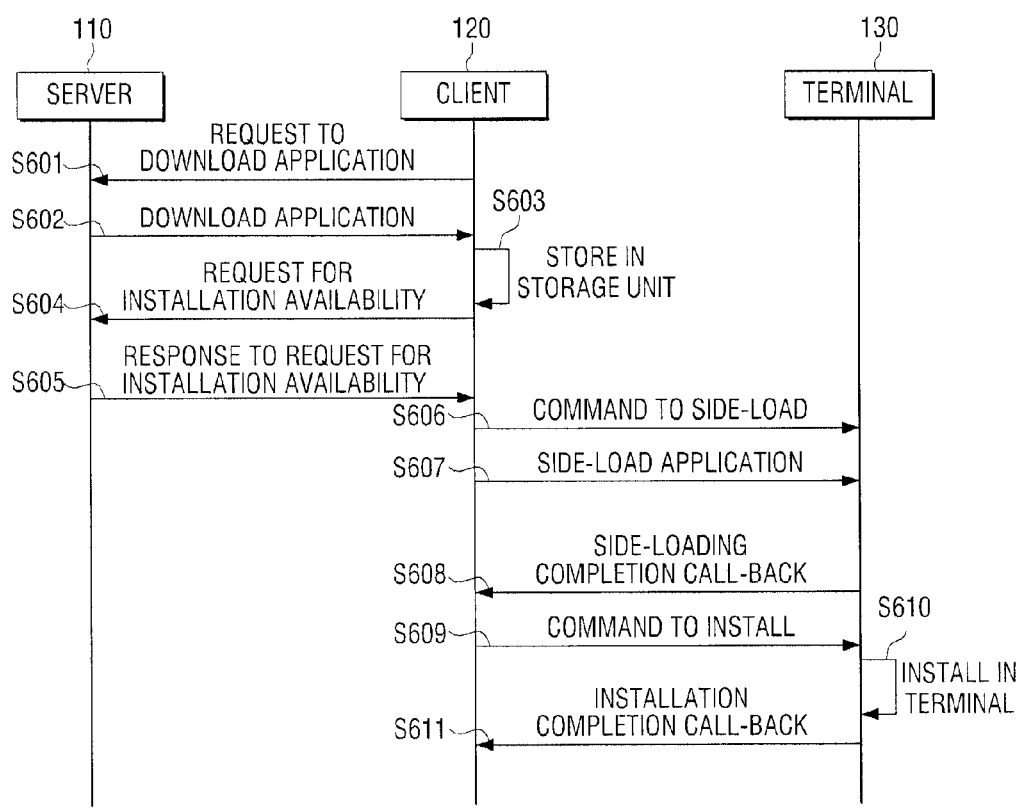
FIG. 6 is a flowchart illustrating a method for installing applications according to an exemplary embodiment.

FIG. 6 is a flowchart illustrating a method for installing applications according to an exemplary embodiment.

First, the client 120 transmits a request to download at least one application to the server 110 (S601).

Herein, the communication protocol between the client 120 and the server 110 may be a HTTPS protocol.

Subsequently, the client 120 downloads an application from the server 110 in response to the download request from the server 110 (S602) and stores the downloaded application in a storage unit (S603).

Herein, the applications may be downloaded stored in the storage unit in the order of completion of downloading from the server 110.

In an exemplary embodiment of downloading applications (S602), applications may be downloaded from the server 110 in asynchronous manner.

When applications are downloaded (S602), applications may be downloaded through a one-time URL address transmitted from the server 110.

Herein, the one-time URL address is generated as random characters are combined and may be abolished/discarded after being used one time.

In an exemplary embodiment of storing applications (S603), the applications downloaded from the server 110 may be stored in a storage unit of the client 120 in the form of package.

Subsequently, in order to see if it is possible to install an application stored in the client 120 in a terminal, the client 120 transmits a request for installation availability of application to the server 110 in the order of completion of downloading of applications (S604).

In other words, the client 120 transmits to the server 110 a request for installation availability of an application purchased and downloaded from the server 110 in the terminal 130 which is connected to the client 120, and receives a response to the request from the server 110. This is to prevent, for example, an application X which is purchased by a user A and installed in the terminal 130 of the user A from being installed in the terminal 130 of a user B. The server 110 stores information regarding a user terminal such as a type of apparatus or a phone ID of the user terminal 130 which purchases an application and may transmit a response to the request for installation availability of an application to the client 120 using stored information regarding the user terminal.

Subsequently, the client 120 receives a response to the request for installation availability of an application from the server 110 (S604). If the client 120 receives a response that it is possible to install an application, the client 120 transmits a command to side-load the application to the terminal 130 and performs side-loading of the actual application stored in the client 120 on the terminal (S606).

Herein, the side-loading represents transmitting contents for a personal computer to a terminal, for example, copying and sending a music file or video, which is contents for a personal computer, to a terminal such as a cellular phone via a USB cable or wirelessly.

Herein, a side-loading command and an installation command may be transmitted to the terminal 130 using object exchange (OBEX). The OBEX is a communication protocol between a terminal and a client, and may be regarded as a kind of MODEM communication. The OBEX is used mostly when a command is transmitted to a terminal.

In addition, applications may be side-loaded on a terminal using a media transfer protocol (MTP). The MTP is a protocol used mostly when a media file is transmitted to a terminal and may be used in compatible with the OBEX. Although the MTP is relatively slow in comparison with a UMS, it provides a better security protection by preventing possibilities of virus or malicious code infiltration.

If the client 120 receives a side-loading completion call-back from the terminal 130 (S608), the client 120 transmits a command to install an application to the terminal (S609).

In other words, if the client 120 receives a side-loading completion call-back indicating that side-loading is completed from the terminal 130, the client 120 transmits a command to install an application to the terminal 130.

Subsequently, the terminal 130 installs the application side-loaded from the client 120 in the terminal 130 (S610), and if installation of the application is completed, transmits an installation completion call-back to the client 120 (S611).

Accordingly, in an application installing system according to an exemplary embodiment, applications are downloaded from the server 110 in an asynchronous manner. Therefore, the client 120 may navigate other applications, that is, make inquires into or search for other applications in an application store while an application available in the application store is being downloaded or installed. In addition, only one application may be installed without synchronizing the entire applications and thus, user convenience may be enhanced.

Meanwhile, the above-mentioned application installing method may be embodied as a program command executable through various computer means and recorded in a recording medium readable by a computer. In this case, the recording medium readable by a computer may include a program command, a data file, and data configuration alone or in combination. Meanwhile, the program command recorded in the recording medium may be exclusively designed and configured for the present invention or may be known to and commonly used by those skilled in the field of computer software industry.

The recording medium readable by a computer includes magnetic media such as a hard disk, a floppy disk, and a magnetic tape, optical media such as a CD-ROM and a DVD, magneto-optical media such as a floptical disk, and a hardware apparatus specially designed to store and perform a program command such as ROM, RAM, and a flash memory. Meanwhile, such a recording medium may be a transmission medium such as an optical or metal strip and waveguide including carrier wave which transmits a signal designating a program command, data configuration, and so forth.

In addition, the program command includes a machine code composed by a compiler and a high-level language code executable by a computer using an interpreter. The above-described hardware apparatus may be configured to operate as more than one software module to perform operations of the present invention and vice versa.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for installing an application on an external terminal, the method comprising:

transmitting sequentially at least one request to a server to download applications to be installed on the external terminal;

asynchronously receiving from the server the applications in response to the request and storing the downloaded applications in an order of download completion;

transmitting a search request to the server and displaying information received from the server in response to the search request while the applications are downloading;

determining whether it is capable to install the applications on the external terminal, based on information regarding the external terminal; and if the applications can be installed in the external terminal, transmitting at least one of the stored downloaded application to the external terminal to be installed, wherein the transmitting at least one of the stored downloaded application to the external terminal comprises:

receiving a command to side-load the at least one application on the external terminal;

side-loading the at least one application on the external terminal for installing the at least one application on the external terminal when the side-loading of the at least one application is completed; and receiving a side-loading call-back signal from the external terminal after the external terminal side-loaded the at least one application.

2. The method as claimed in claim 1, wherein a communication with the server is utilizes a Hypertext Transfer Protocol over Secure Socket Layer (HTTPS) protocol.

3. The method as claimed in claim 1, further comprising downloading at least one of the applications through a one-time URL address transmitted from the server.

4. The method as claimed in claim 3, wherein the one-time URL address is generated as random characters are combined and is discarded after being used one time.

5. The method as claimed in claim 1, wherein the storing comprises storing an application downloaded from the server in a form of package.

6. The method as claimed in claim 1, wherein the installing comprises:

receiving from the server a response to a request for availability of installation of the at least one application;

transmitting to the terminal a command to side-load the at least one application and side-loading the at least one application on the terminal; and in response to receive a side-loading completion call-back from the terminal, transmitting to the terminal a command to install the at least one application.

7. The method as claimed in claim 6, wherein the installing further comprises:

receiving an installation completion call-back from the terminal.

8. A method for installing applications, which are downloaded from a server and stored in an external client, the method comprising:

in response to receiving a command to side-load the applications as received from the client, side-load the applications from the client;

in response to completion of the side-loading, transmit a side-loading call-back signal to the client; and in response to receiving commands to install the side-loaded applications from the client, install the side-loaded applications, wherein the side-loaded applications are:

downloaded from the server according to a purchase order in which the applications were purchased, stored in the client in a download order in which each application completed downloading from the server to the external client, and side-loaded according to the download order and not the purchase order.

9. The method as claimed in claim 8, wherein the side-loading command and the installing command are received using object exchange (OBEX).

10. The method as claimed in claim 8, wherein the application is side-loaded using a Media Transfer Protocol (MTP).

11. A system for installing an application, which is requested by a client and downloaded from a server on an external terminal, comprising:

the server configured to:

store a plurality of applications and information regarding the external terminal, and transmit one or more applications in response to a request; and the client including a display, the client configured to:

transmits sequentially at least one request to the server to download applications to be installed on the external terminal, asynchronously receive from the server the applications in response to the request and store the downloaded applications in an order of download completion, transmit a search request to the server and display information received from the server in response to the search request while the applications are downloading, determine whether it is capable to install the applications on the external terminal, based on the information regarding the external terminal, and if the applications can be installed in the external terminal, transmit the at least one stored application to the external terminal to be installed, wherein the client further configured to:

receive a command to side-load the at least one application on the external terminal; and side-load the at least one application on the external terminal for installing the at least one application on the external terminal when the side-loading of the at least one application is completed; and receive a side-loading call-back signal from the external terminal after the external terminal side-loaded the at least one application.

12. The system as claimed in claim 11, wherein communication with the server utilizes a Hypertext Transfer Protocol over Secure Socket Layer (HTTPS) protocol.

13. The system as claimed in claim 11, the client further configured to:

download the applications in a first queue arranged in an order in which the applications were requested; and store the downloaded applications in a second queue in an order in which the applications completed downloading.

14. The system as claimed in claim 11, the client further configured to download the application through a one-time URL address transmitted from the server.

15. The system as claimed in claim 14, wherein the one-time URL address is generated as random characters are combined and is discarded after being used one time.

16. The system as claimed in claim 11, the client further configured to:

transmit a request to the server for confirmation that one of the downloaded application is available to install;

upon receiving a positive response from the server to the request, transmit a command to the terminal to side-load the one of the downloaded applications; and transmit a command to install the one of the downloaded applications in response to receiving a side-loading completion call-back from the terminal.

17. The system as claimed in claim 16, the client further configured to: receive an application installation completion call-back from the terminal.

18. A system for installing applications, which are downloaded from a server and stored in an external client, comprising:
    a controller configured to:
    in response to receiving a command to side-load the stored applications as received from the client, receive side-loading of the stored applications from the client;
    in response to completion of the side-loading, transmit a side-loading call-back signal to the client; and
    in response to receiving a command to install the side-loaded applications from the client, install the side-loaded applications,
    wherein the side-loaded applications are:
        downloaded from the server according to a purchase order in which the applications were purchased,
        stored in the client in a download order in which each application completed downloading from the server to the external client and not in the purchase order, and
        side-loaded according to the download order and not the purchase order.

19. The system as claimed in claim 18, wherein the command to side-load and the command to install are received using object exchange (OBEX).

20. The system as claimed in claim 18, wherein the application is side-loaded on using a Media Transfer Protocol (MTP).

\* \* \* \* \*

UNITED STATES PATENT AND TRADEMARK OFFICE
CERTIFICATE OF CORRECTION

| | |
|---|---|
| PATENT NO. | : 8,935,690 B2 |
| APPLICATION NO. | : 13/018554 |
| DATED | : January 13, 2015 |
| INVENTOR(S) | : Jin-hee Kim et al. |

It is certified that error appears in the above-identified patent and that said Letters Patent is hereby corrected as shown below:

In the Claims

Column 9, Claim 2, Line 28 should read as follows:
--...the server utilizes a...--

Signed and Sealed this
Fourteenth Day of April, 2015

Michelle K. Lee
*Director of the United States Patent and Trademark Office*